United States Patent [19]

Ishizaki

[11] Patent Number: 5,764,950
[45] Date of Patent: Jun. 9, 1998

[54] DATA PROCESSING SYSTEM HAVING A FUNCTION OF CHANGING BUS WIDTH

[75] Inventor: Norihiko Ishizaki, Tokyo, Japan

[73] Assignee: NEC Corporation, Tokyo, Japan

[21] Appl. No.: 363,824

[22] Filed: Dec. 27, 1994

[30] Foreign Application Priority Data

Dec. 27, 1993 [JP] Japan ............................ 5-333637

[51] Int. Cl.6 ............................................. G06F 13/42
[52] U.S. Cl. .................. 395/500; 364/240.3; 364/240.8; 364/260.4; 364/DIG. 1
[58] Field of Search ........................... 395/306, 307, 395/308, 500, 800

[56] References Cited

U.S. PATENT DOCUMENTS

| 4,716,527 | 12/1987 | Graciotti | 395/500 |
| 4,831,514 | 5/1989 | Turlakov et al. | |
| 5,307,469 | 4/1994 | Mann | 395/405 |
| 5,335,340 | 8/1994 | Strong | 395/500 |
| 5,341,481 | 8/1994 | Tsukamoto | 395/287 |

FOREIGN PATENT DOCUMENTS

0466970A1  1/1992  European Pat. Off.
4235782  3/1994  Japan.

Primary Examiner—Kevin J. Teska
Assistant Examiner—Ayni Mohamed
Attorney, Agent, or Firm—Whitham, Curtis, Whitham & McGinn

[57] ABSTRACT

In a microcomputer, a high-order address bus of a control processing unit (CPU) is coupled to a first input of an address selector and an address latch having an output coupled to a second input of the address selector. An output of the address selector is connected to one input of a multiplexer having the other input connected to a high-order data bus of the CPU and an output connected to high-order address/data bus terminals. In the case that the microcomputer is coupled to only 8-bit external memories, the high-order address is outputted through the high-order address/data bus terminals during a period of accessing the external memory, and the address latch and the address selector are controlled to output the high-order address latched in the address latch through the high-order address/data bus terminals during a period of executing no access to the external memory.

10 Claims, 9 Drawing Sheets

DATA PROCESSING SYSTEM HAVING A FUNCTION OF CHANGING BUS WIDTH

BACKGROUND OF THE INVENTION

1. Field of the Invention

The present invention relates to a data processing system, and more specifically a data processing system having an improved address output function.

2. Description of Related Art

As a technique for running speedily a microcomputer, it is generally employed to enlarge the bus width for accessing external memories. For example, it is possible to double the bus capacity at maximum by changing the line width from an 8-bit length to a 16-bit length.

However, enlargement of the bus width will increase the number of parts for controlling the bus and the number of wiring conductors, with the result that the system cost increases. On the other hand, memories of large bus width are high in price, and their acquisition is difficult.

Because of this, each maker offers microcomputers having a bus sizing function that is possible to select a large bus width for a high grade system and a short bus width for a low price system.

One example of the microcomputer having the bus sizing function is disclosed in the specification of Japanese Patent Application No. Hesei 4-235782 which was published as Japanese Patent Application No. Heisei 4-235782, laid open as Japanese Patent Application Laid-open Publication JP-A-6-83765.

The microcomputer described in JP-A-6-83765 is so configured that an address space allocated for an external memory is divided into a plurality of regions, and has a plurality of flags each for defining the word length of each region and means for selecting the word length of external data bus terminals in accordance with the status of the flags and an access address.

Now, an internal structure of this microcomputer will be explained with reference to the drawings.

Referring to FIG. 1, there is shown a block diagram illustrating an internal structure of the microcomputer shown in JP-A-6-83765.

The shown microcomputer has a time-sharing bus terminal 2 for a high-order (MSB) address/data (AD(7-0)) of an 8-bit length, a time sharing bus terminal 3 for a low-order (LBS) address/data (AD(15-8)) of an 8-bit length, a terminal 4 for an address latch timing signal ASTB, a terminal 5 for a read signal terminal $\overline{RD}$, a terminal 6 for a write signal for an even-numbered address $\overline{LWR}$, a terminal 7 for a write signal for an odd-numbered address $\overline{HWR}$, a CPU (central processing unit) 31, a high-order data bus 32, a low-order data bus 33, a high-order address bus 34, a low-order address bus 35, bus width designating flags 36, an address comparator 37, a data selector 39, multiplexers 641 and 642 and a timing generating circuit 643, which are coupled as shown in FIG. 1.

At a memory access time, the CPU 31 outputs an address to the high-order address bus 34 and the low-order address bus 35, and also outputs or receives data to or from the high-order data bus 32 and the low-order data bus 33. Furthermore, the CPU 31 outputs an external memory selecting signal 45, a read signal 46, a write signal 47 and a clock 643 to the timing generating circuit 48.

The high-order address bus 34 is connected to the AD(15-8) terminals 3 through the multiplexer 641, and supplies an address to the address comparator 37. The low-order address bus 35 is connected through the multiplexer 642 to the AD(7-0) terminals 2.

The high-order data bus 32 is connected to the AD(15-8) terminals 3 through the multiplexer 641, and connected to the AD(7-0) terminals 3 through the data selector 39 and the multiplexer 642. The low-order data bus 33 is connected through the data selector 39 and the multiplexer 642 connected to the AD(7-0) terminals 2, and supplies a setting data to the bus width designating flag 36.

The bus width designating flag 36 can be written by the CPU 31 through the low-order data bus 33. The address comparator 37 compares the bus width designating flag with the high-order address, and supplies the bus width designating signal 44 to the data selector 39 and the timing generating circuit 643.

The timing generating circuit 643 generates a timing control signal 49 for time-sharing which is supplied to the multiplexers 641 and 642. Furthermore, the timing generating circuit 643 simultaneously generates ASTB 4, $\overline{RD}$ 5, $\overline{LWR}$ 6, and $\overline{HWR}$ 7.

Now, an internal action of the microcomputer is explained.

First, CPU 31 writes into the bus width designating flag 36 through the low-order data bus 33 to designate the word length of an externally connected memory.

In the shown example, a bit "0" of the bus width designating flag 36 corresponds to an address region from 0000H to 7FFFH, and a bit "1" corresponds to an address region from 8000H to FFFFH (where the last character "H" means a hexadecimal notation.

When the bus width designating flag 36 is at a high level, the AD(7-0) terminals 2 and the AD(15-8) terminals 3 cooperate to constitute a 16-bit length when the external memory is accessed. When the bus width designating flag 36 is at a low level, a bus having an 8-bit length is constituted.

After the execution of the setting of the bus width designating flag 36, it is possible to access an arbitrary address region in accordance with a program.

When an access for the external memory occurs, the CPU 31 outputs an address for the external memory to the high-order address bus 34 and the low-order address bus 35, and receives and outputs data from or to the high-order data bus 32 and the low-order data bus 33. Furthermore, the CPU 31 outputs either the read signal 46 or the write signal 47, and also the external memory selecting signal 45 and the clock 48.

The address comparator 37 generates the bus width designating signal 44 on the basis of the address on the high-order address bus 34 and the status of a corresponding flag of the bus width designating flags 36, and outputs its to the timing generating circuit 643 and the data selector 39.

The timing generating circuit 643 controls the timing of ASTB 4, $\overline{RD}$ 5, $\overline{LWR}$ 6 and $\overline{HWR}$ 7, based on the bus width designating signal 44, the read signal 46, the write signal 47, the external memory selecting signal 45 and the clock 48. Simultaneously, the timing generating circuit 643 controls the timing of the time-sharing of the multiplexer 641 and 642.

The data selector 39 selects which of the high-order data bus 32 and the low-order data bus 33 is coupled to the AD(7-0) terminals 2, on the basis of the bus width designating signal 44.

The AD(7-0) terminals 2 and the AD(15-8) terminals 3 output an address when ASTB 4 is at a high level, and receive and output data when one of $\overline{RD}$ 5, $\overline{LWR}$ 6 and $\overline{HWR}$ 7 is at a low level.

The ASTB 4 is indicative of a latch timing of the address outputted on the AD(7-0) terminals 2 and the AD(15-8) terminals 3. The $\overline{RD}$ 5, and the $\overline{LWR}$ 6 and the $\overline{HWR}$ 7 request a reading from the external memory, a writing through the high-order bus to the external memory, and a writing through the low-order bus to the external memory, respectively.

Next, a system in which an external memory is connected to the conventional microcomputer, will be explained with reference to FIG. 2 and FIG. 3. FIG. 2 shows a system in which the conventional microcomputer is connected to a RAM having an 8-bit word length and a ROM of a 16-bit word length, and FIG. 3 shows a timing chart when a conventional microcomputer accesses the external memories.

The AD(7-0) terminals 2 of the microcomputer 701 is connected to the ROM 15 and the RAM 16 through a low-order bus 10 and an address latch 8.

When the ROM 15 and the RAM 16 are accessed, the AD(7-0) terminals 2 output the low-order 8 bits of an access address. Further, when an even-numbered address is accessed, the AD(7-0) terminals 2 output and receives 8 bit data. But, in the case of 8 bits of the bus width, the AD(7-0) terminals 2 receive and output data both at an odd-numbered address accessing time and at an even-numbered address accessing time.

The AD(15-8) terminals 3 are connected to the ROM 15 and the RAM 16 through a high-order bus 11 and an address latch 9. The AD(15-8) terminals 3 output the high-order 8 bits of the address, and receive and output an 8-bit data at an odd-numbered address. However, the AD(15-8) terminals 3 output only the high-order address when the bus width is 8 bits.

The ASTB 4 is connected to the address latches 8 and 9, and when the ASTB 4 is brought to a high level, and address outputted from the AD(15-8) terminals 3 and the AD(7-0) terminals 2 should be latched in the address latches 8 and 9, respectively.

The $\overline{RD}$ 5 is connected to a read enable terminal $\overline{OE}$ of each of the ROM 15 and the RAM 16, and is brought to a low level at a data read time. The $\overline{LWR}$ 6 is connected to a write enable terminal $\overline{WE}$ of the RAM 16. The $\overline{HWR}$ 7 is connected to nothing, because the bus width of RAM 16 is 8 bits.

The $\overline{LWR}$ 6 and the $\overline{HWR}$ 7 indicate a writing timing of data to an even-numbered address and an odd-numbered address of the memories, respectively. But, when the bus width is 8 bits, the moment the $\overline{LWR}$ 6 is brought to a low level is a write timing, regardless of which of an even-numbered address and an odd-numbered address should be written.

The address decoder 13 selects one of the ROM 15 and the RAM 16, and outputs its selection signal directly to a chip selection terminal $\overline{CE}$ of the ROM 15 and through an inverter 17 to a chip selection terminal $\overline{CE}$ of the RAM 16.

The ROM 15 has a bus width of a 16-bit length, and the RAM 16 has a bus width of an 8-bit length.

The AD(15-8) terminals 3 and the AD(7-0) terminals 2 of the conventional example are constructed on the premise that the output address is latched in the address latches 8 and 9, which respond to only the ASTB 4 so as to latch and hold the address. In addition, in the conventional example, the AD(15-8) terminals 3 and the AD(7-0) terminals 2 are put in a high impedance condition, except for the access time to the external memory.

FIG. 4 shows a system in which only 8-bit word length memories are connected to the conventional microcomputer. In FIG. 4, elements similar to those shown in FIG. 2 are given the same Reference Numerals, and explanation thereof will be omitted.

In the system shown in FIG. 4, a ROM 115 has an 8-bit word length, and is connected to the address latches 8 and 9, the low-order bus 10, the address decoder 13 and the $\overline{RD}$ 5, as shown in the drawing. The system of FIG. 4 differs from that of FIG. 2 in that the TOM 115 is not connected to the high-order bus 11 because of the 8-bit length memory.

The reason why the address latches of 16 bits in total are required, is that there is a possibility that the AD(15-8) terminals 3 and the AD(7-0) terminals 2 output the address at only the timing of ASTB 4.

The conventional microcomputer as mentioned above needs, as its external means, an address latch of a word length corresponding to a long word length, since an output of the address/data time-sharing bus terminal is not guaranteed for a period other than the access to the external memory. If the address latch is not provided, the memory address input varies even at the time of accessing a memory having a short word length, and as a result, the system malfunctions. Furthermore, a great current slows because the address input is at a floating state. Thus, the address latch is required, thereby increasing the number of parts.

Besides, at occasions of development of a higher rank of device interchangeable to microcomputers which are adapted to be connected to only memories of a short word length, especially, the interchangeability for external connections must be supported. In this case, an increase of the address latches defeats interchangeability with a conventional system.

SUMMARY OF THE INVENTION

Accordingly, it is an object of the present invention to provide a data processing system which has overcome the above mentioned defect of the conventional one.

Another object of the present invention is to provide a data processing system capable of reducing the number of address latches when it is coupled to a system having a shorter address word length.

The above and other objects of the present invention are achieved in accordance with the present invention by a data processing system comprising a plurality of address/data bus terminals to be coupled to an external device, an address/data bus terminal being selectively used as an address bus terminal and as a data bus terminal in a time sharing manner, an address space for the external device being divided into a plurality of regions, and a selection means for selecting a word length of a bus for each of the plurality of regions, and a means for continuously outputting an address from a terminal, not to be used as a data bus terminal, of the address/data bus terminals, during an accessing time, when the region having a short word length is accessed.

Preferably, the data processing system can have a means for outputting a high level signal or a low level signal from a part or all of the address/data bus terminals during a period in which the external device is not accessed.

Further, the data processing system can have a means for outputting an address from a part or all of the address/data bus terminals during a period in which the external device is not accessed.

Also, the data processing system can have a memory means for storing an address having accessed to the external device, and another means for outputting the address stored in the memory means from a part or all of the address/data bus terminals during a period in which the external device is not accessed.

The above and other objects, features and advantages of the present invention will be apparent from the following description of preferred embodiments of the invention with reference to the accompanying drawings.

DESCRIPTION OF THE PREFERRED EMBODIMENTS

Now, preferred Embodiments will be described with reference to the accompanying drawings.

Figure 5:
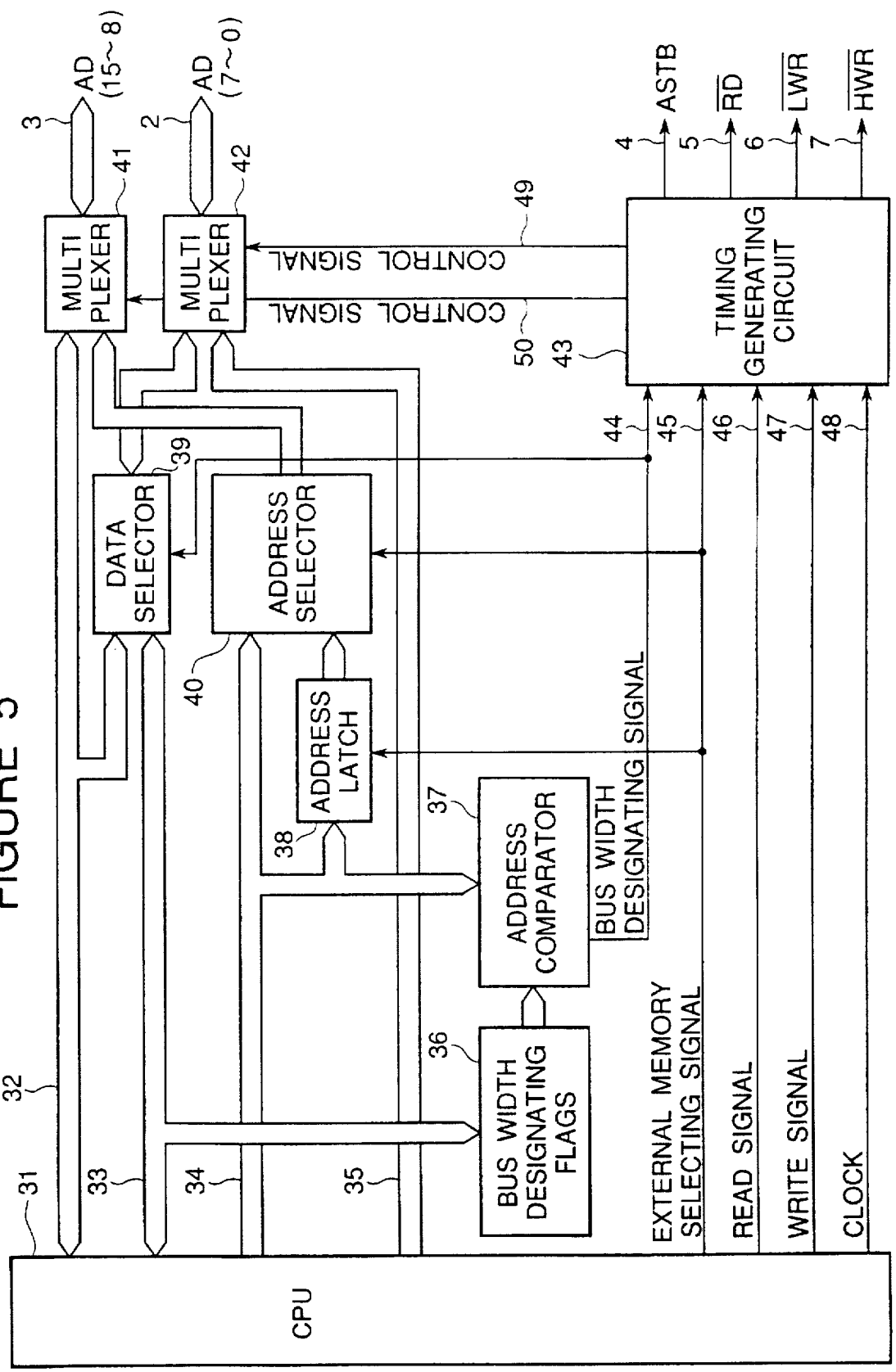
FIG. 5 is a block diagram illustrating a principal part of an internal structure of a first embodiment of the microcomputer in accordance with the present invention.

FIG. 5 is a block diagram illustrating a principal part of an internal structure of a first embodiment of the microcomputer in accordance with the present invention. In FIG. 5, elements similar to those shown FIG. 1 are given the same Reference Numerals, and explanation thereof will be omitted.

Figure 1:
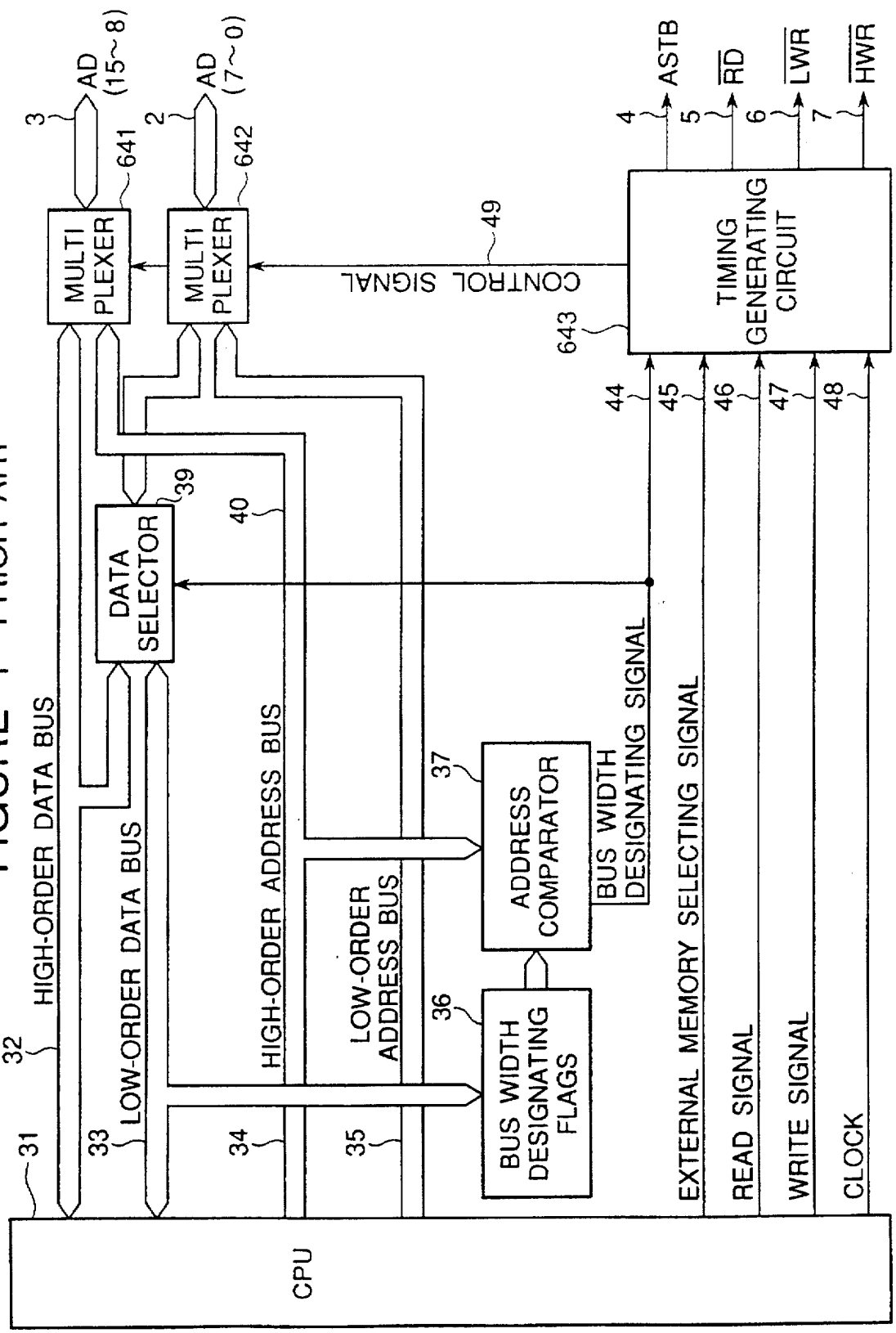
FIG. 1 is a block diagram illustrating a principal part of an internal structure of a typical conventional microcomputer.
Figure 2:
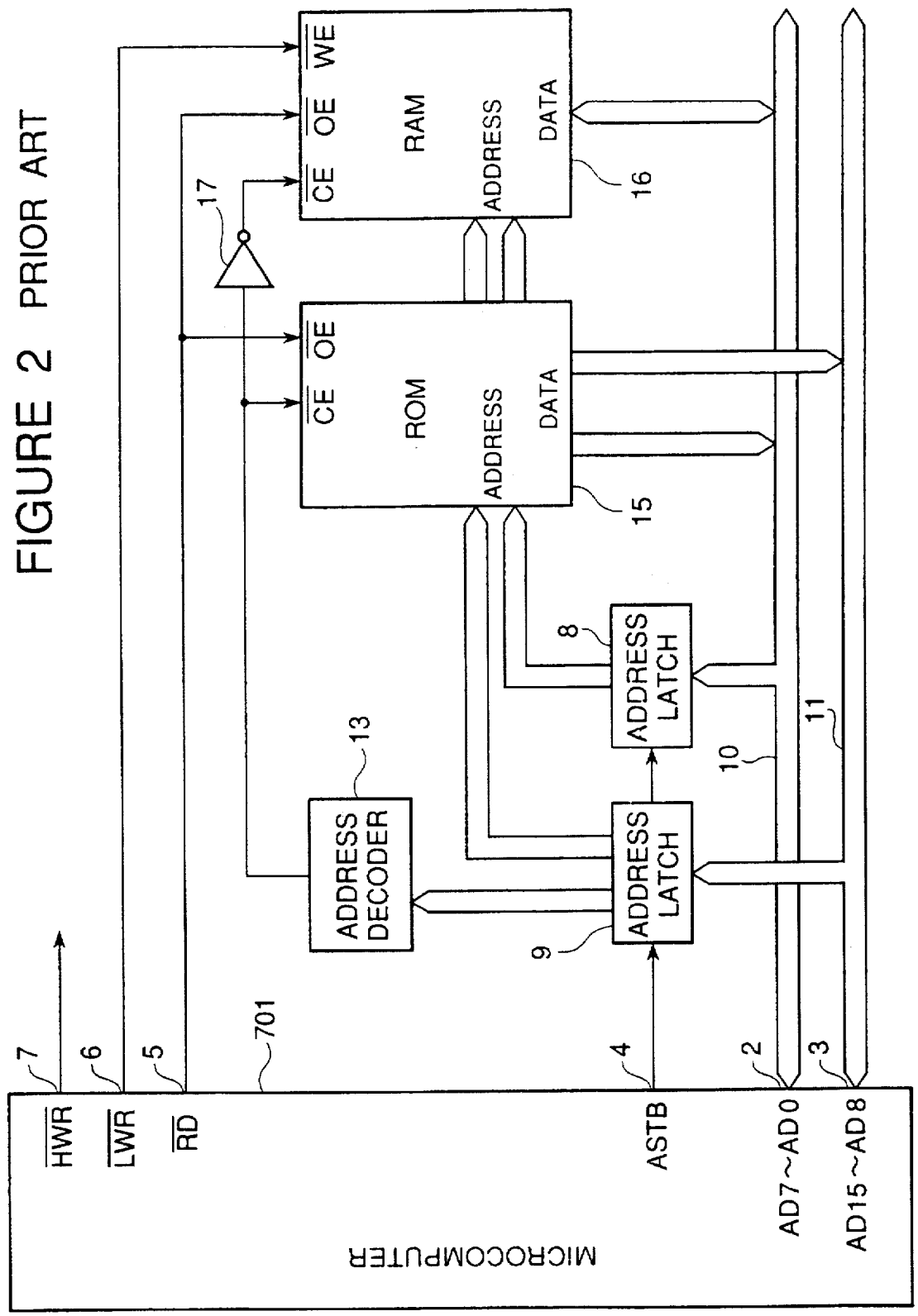
FIG. 2 is a block diagram illustrating a conventional system in which a microcomputer is connected to a 8-bit word length RAM and a 16-bit word length ROM.
Figure 3:
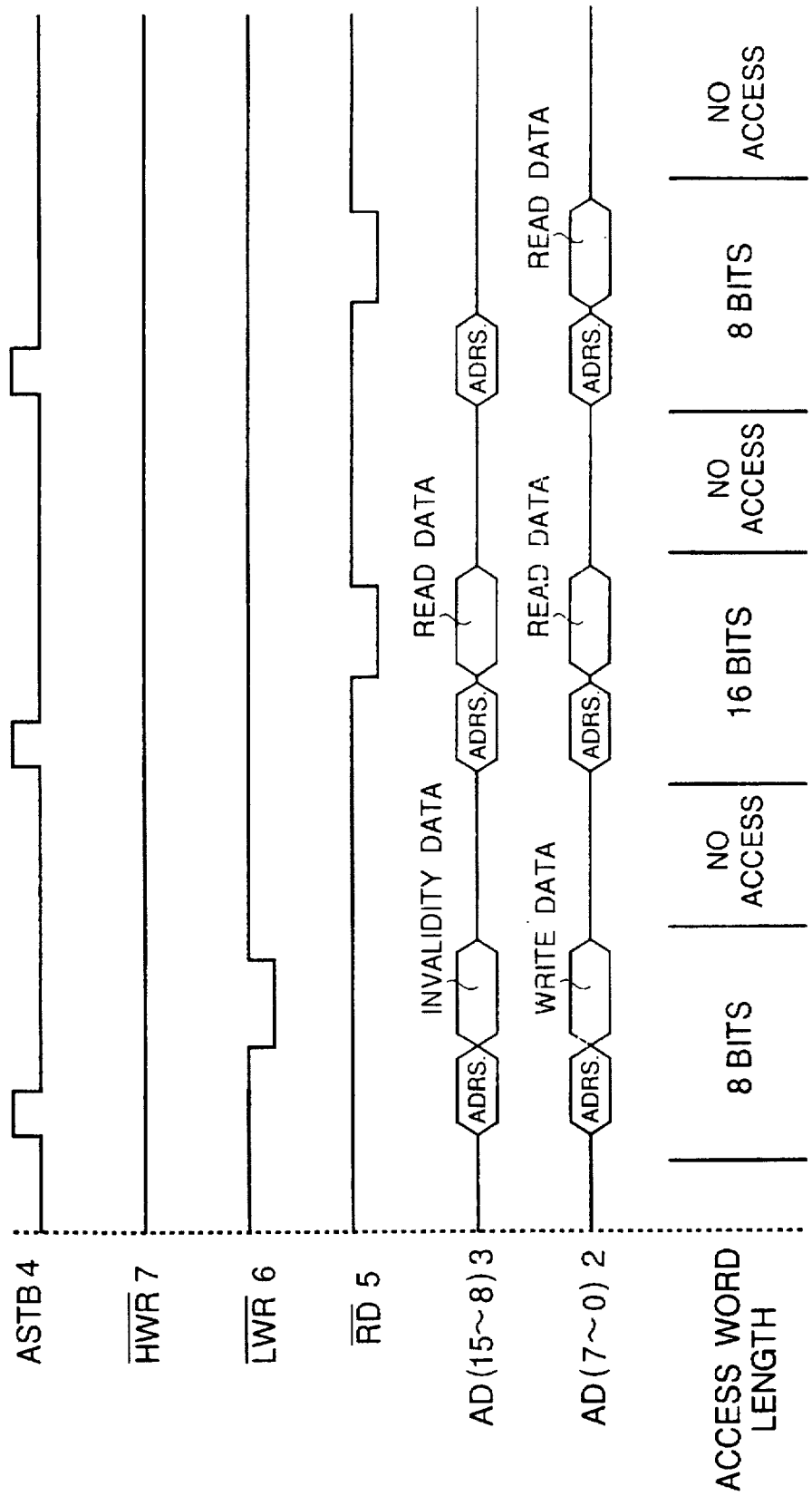
FIG. 3 is a timing chart illustrating a memory access in the microcomputer system shown in FIG. 2.

As seen from comparison between FIGS. 1 and 5, the first embodiment is different from the conventional example shown in FIG. 1 only in that an address latch 38 and an address selector 40 are added. Namely, in the conventional example, the AD(15-8) terminals of the CPU 31 is connected directly to the multiplexer 641 through the high-order address bus 34, but, in this embodiment, the address selector 40 is inserted on the way of the high-order address bus 34, and a first one of the input terminals of the address selector 40 is connected to the high-order address bus 34 and, the other or second input terminal of the address selector 40 is connected to the address latch 38, which is in turn connected to the high-order address bus 34. An output terminal of the address selector 40 is connected to the multiplexer 41.

Further, the address latch 38 and the address selector 40 are controlled by the external memory selecting signal 45, the multiplexer 41 and a multiples 42 (corresponding to the multiplexers 641 and 642, respectively) are controlled by a timing control signal 50 and the timing control signal 49 supplied from the timing generating circuit 43, respectively.

The other construction of the first embodiment shown in FIG. 5 is the same as that shown in FIG. 1. The elements 41, 42 and 43 correspond to the elements 641, 642 and 643 in the conventional example shown in FIG. 1, respectively.

The address latch 38 latches an address on the high-order address bus 34 in synchronism with the external memory selecting signal 45, and supplies the latched address to the address selector 40.

The address selector 40 outputs the address kept in the address latch 38 to the multiplexer 41 during a period in which no access is made to an external memory. In addition, when the external memory is accessed, the address selector 40 outputs the address on the high-order address bus 34.

The timing generating circuit 43 generates the control signals 49 and 50 in response to the bus width designating signal 44, the external memory selecting signal 45, the read signal 46, the write signal 47 and the clock 42, for the purpose of controlling a time sharing action and an input/output action of the multiplexers 41 and 42. Moreover, it generates the ASTB 4, the $\overline{\text{RD}}$ 5, the $\overline{\text{LWR}}$ 6 and the $\overline{\text{HWR}}$ 7.

Figure 6:
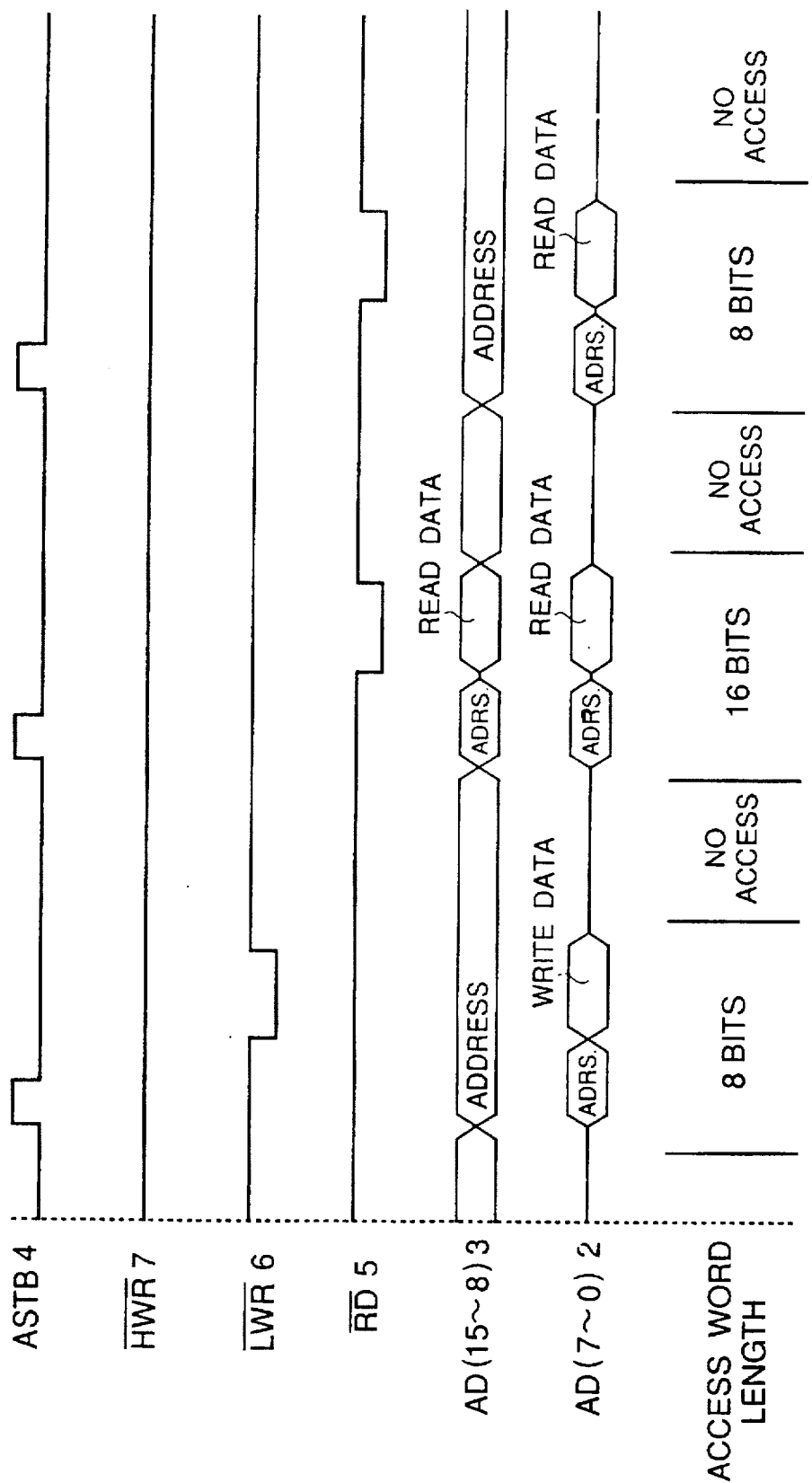
FIG. 6 shows a timing chart of a memory access of the first embodiment.

Now, a timing chart of a memory access operation of the first embodiment is explained with reference to FIG. 6. The AD(7-0) terminals 2 and the AD(15-8) terminals 3 output an address during a period in which the ASTB 4 is at a high level, and receive or output data during a period in which one of the $\overline{\text{RD}}$ 5, the $\overline{\text{LWR}}$ 6 and the $\overline{\text{HWR}}$ 7 is at a low level.

During a period in which the CPU 31 does not execute an access to the external memory, the address latch 38 latches the address in synchronism with the external memory selecting signal 45, and the address selector 40 outputs the address selected in accordance with the external memory selecting signal 45, to the AD(15-8) terminals 3 through the multiplexer 41. In this situation, this address is an external memory address accessed just before.

When the external memory is accessed, the AD(15-8) terminals 3 continue to output the high-order address during its accessing time period, if the access word length (bus width) is 8 bits. If the bus width is 16 bits, the AD(15-8) terminals 3 output the high-order address and receive and output an odd-numbered address in the time sharing manner like the conventional example.

Accordingly, the AD(15-8) terminals 3 keep or output the high-order address except for the period in which the memory of a 16-bit bus width is accessed.

Next, in a case that a 8-bit word length memory and a 16-bit word length memory are connected together to the shown microcomputer of this invention, the AD(15-8) terminals 3 act in the time sharing manner when the access is executed with the bus width of 16 bits, similarly to the conventional example. In this case, therefore, an address latch of 16 bits is necessary. Accordingly, the system structure becomes the same as the conventional example, and therefore, its explanation is omitted herein.

Now, explanation will be made on a case in that only 8-bit word length memories are connected to the microcomputer shown in FIG. 5.

Figure 7:
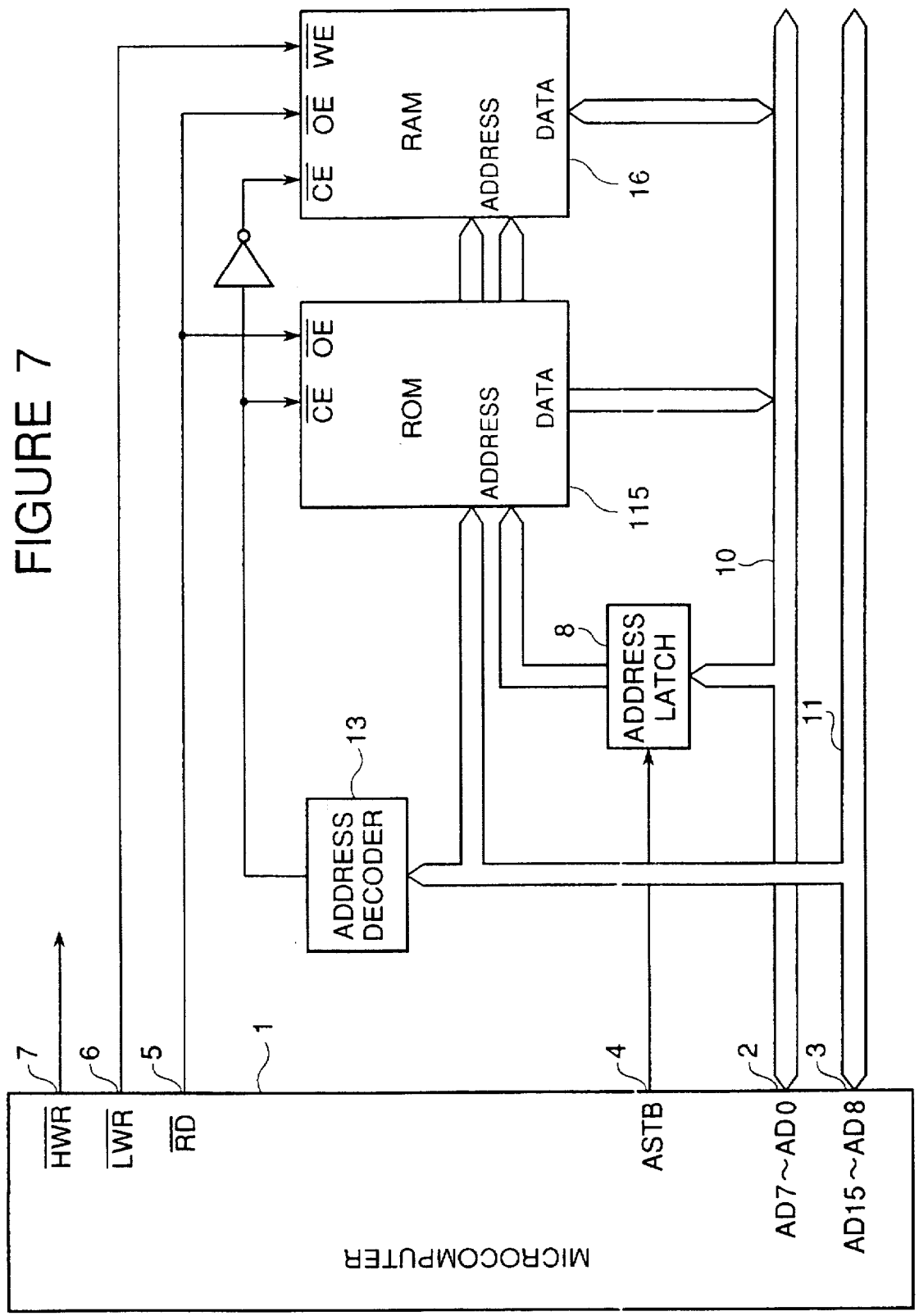
FIG. 7 is a block diagram illustrating a principal part of a system using the microcomputer of the first embodiment.

Referring to the FIG. 7, there is shown a principal part of the system in which the microcomputer of the first embodiment is coupled to only 8-bit word length memories. In FIG. 7, elements similar to those shown in FIG. 4 are given the same Reference Numerals, and explanation thereof will be omitted.

Figure 4:
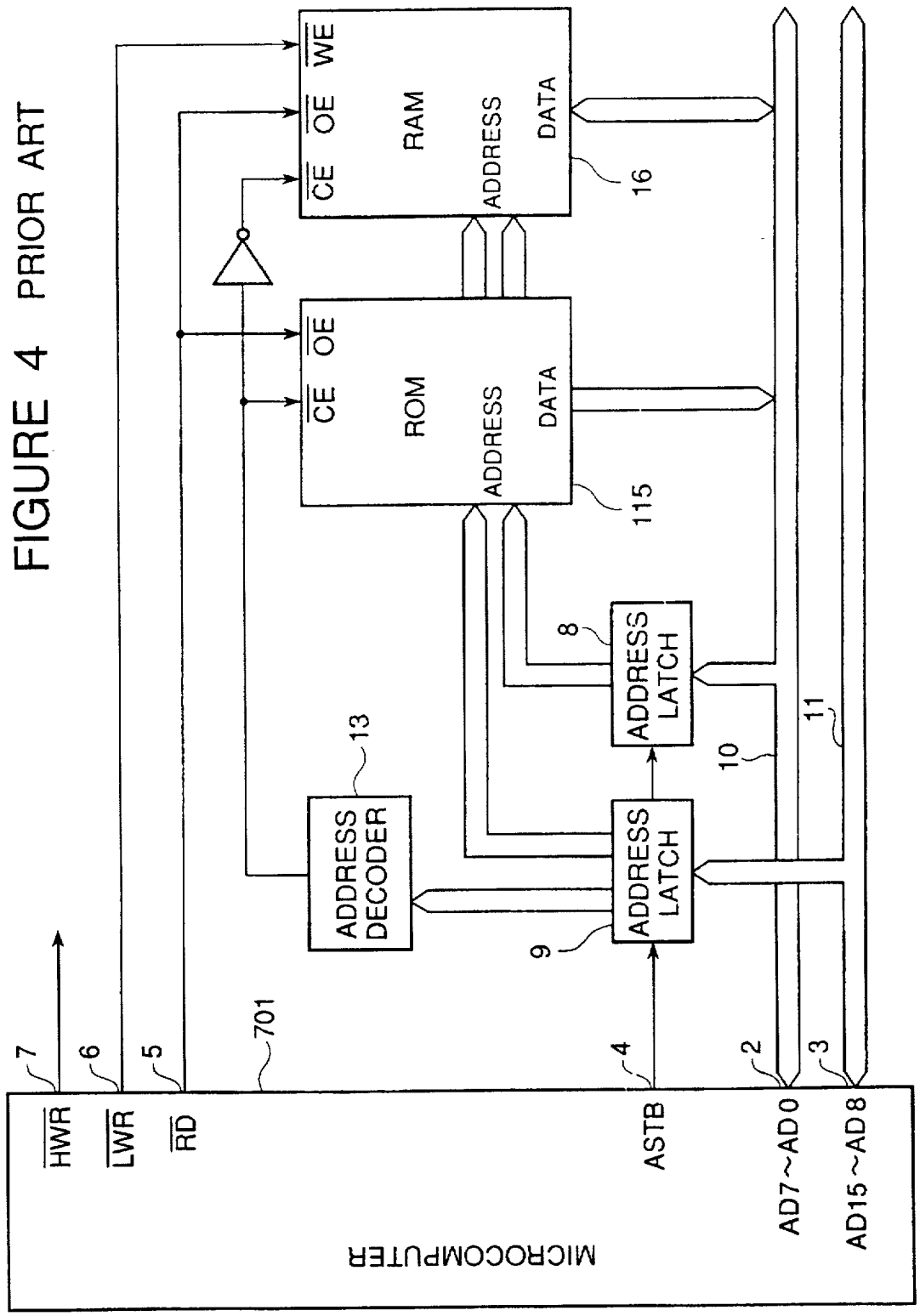
FIG. 4 is a block diagram illustrating another conventional system in which a microcomputer is connected to only memories having an 8-bit word length.

As seen from comparison between FIGS. 4 and 7, the system shown in FIG. 7 is different from the system shown in FIG. 4 in that the AD(15-8) terminals 3 are connected directly to a ROM 115 and the address decoder 13 without intermediary of the address latch 9 provided in the system shown in FIG. 4. The other parts of the constructions are the same as those of the conventional example.

As mentioned above, when the 8-bit word length memory is accessed, the AD(15-8) terminals 3 output the high-order address during the accessing time period, and continue to output the high-order address kept in the address latch 38 during a period in which no external memory is accessed. Therefore, although the AD(15-8) terminals 3 are connected directly to a ROM 115 and the address decoder 13, a malfunction does not occur, nor does a through-current flow due to the floating state of the address.

Accordingly, a structure having only 8 bits memories are connected to this embodiment may reduce the number of the external address latches.

In addition, at an external memory accessing time, the output of the AD(15-8) terminals 3 keeps the address, until a next access is performed. As the result, a switching current occurring at the AD(15-8) terminals 3 can be reduced.

Figure 8:
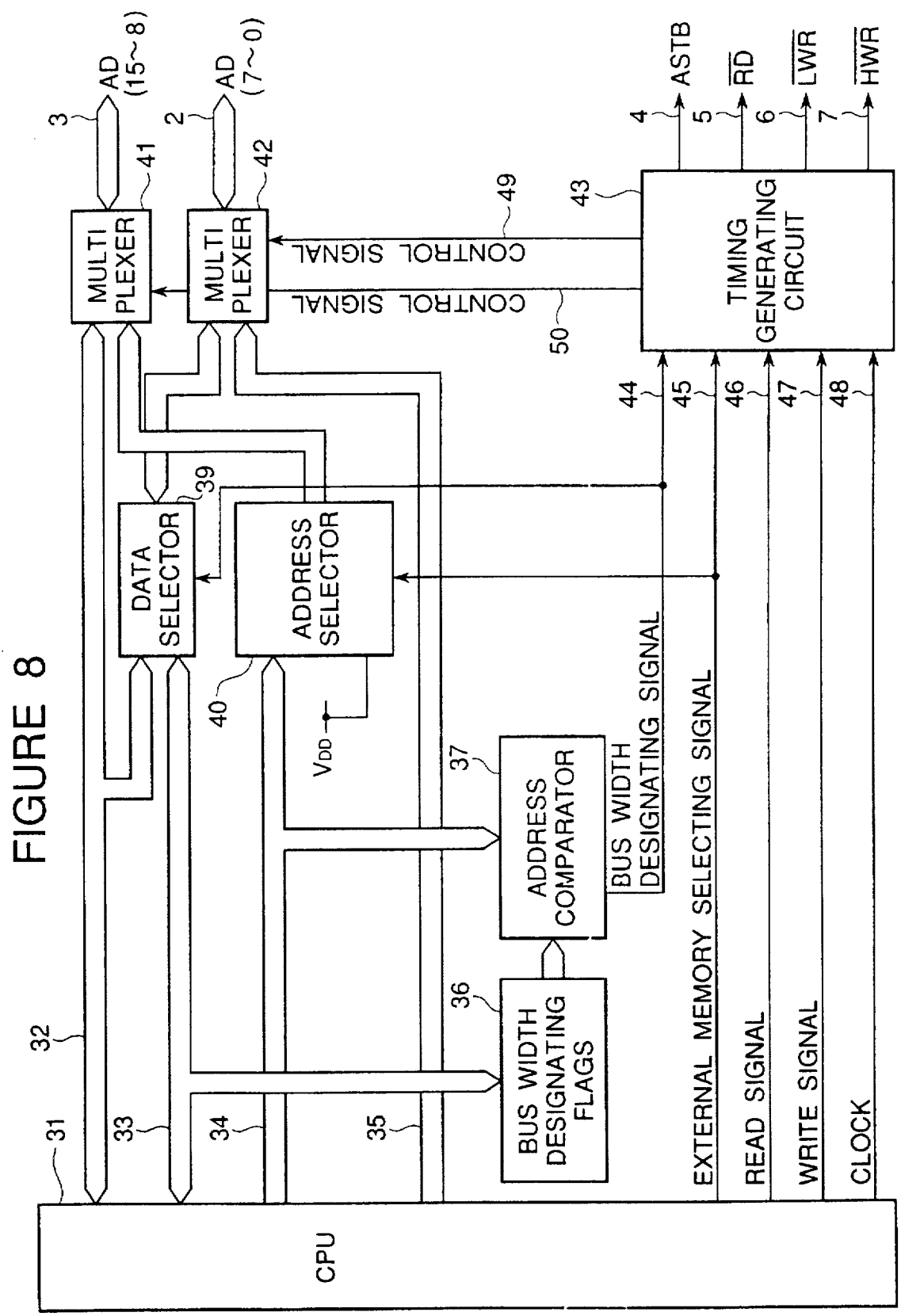
FIG. 8 is a block diagram illustrating a principal part of an internal structure of the second embodiment of the microcomputer in accordance with the present invention.

Next, a second embodiment of the present invention will be explained with reference to FIG. 8, showing a block diagram of a principal part of an internal structure of the microcomputer of the second embodiment. In FIG. 8, elements similar to those shown in FIG. 5 are given the same Reference Numerals, and explanation thereof will be omitted.

As seen from comparison with FIGS. 5 and 8, the second embodiment shown in FIG. 8 is different from the first embodiment in that the address latch 38 is eliminated. Namely, because the address latch 38 is eliminated, the second input terminal of the address selector 40 which was connected to the address latch 38 in the first embodiment (see FIG. 5), is fixed to a high level.

By fixing the second input terminal of the address selector 40 at the high level, the address selector 40 outputs a selected one of the high-order address bus 34 and the fixed high level to the multiplexer 41.

Figure 9:
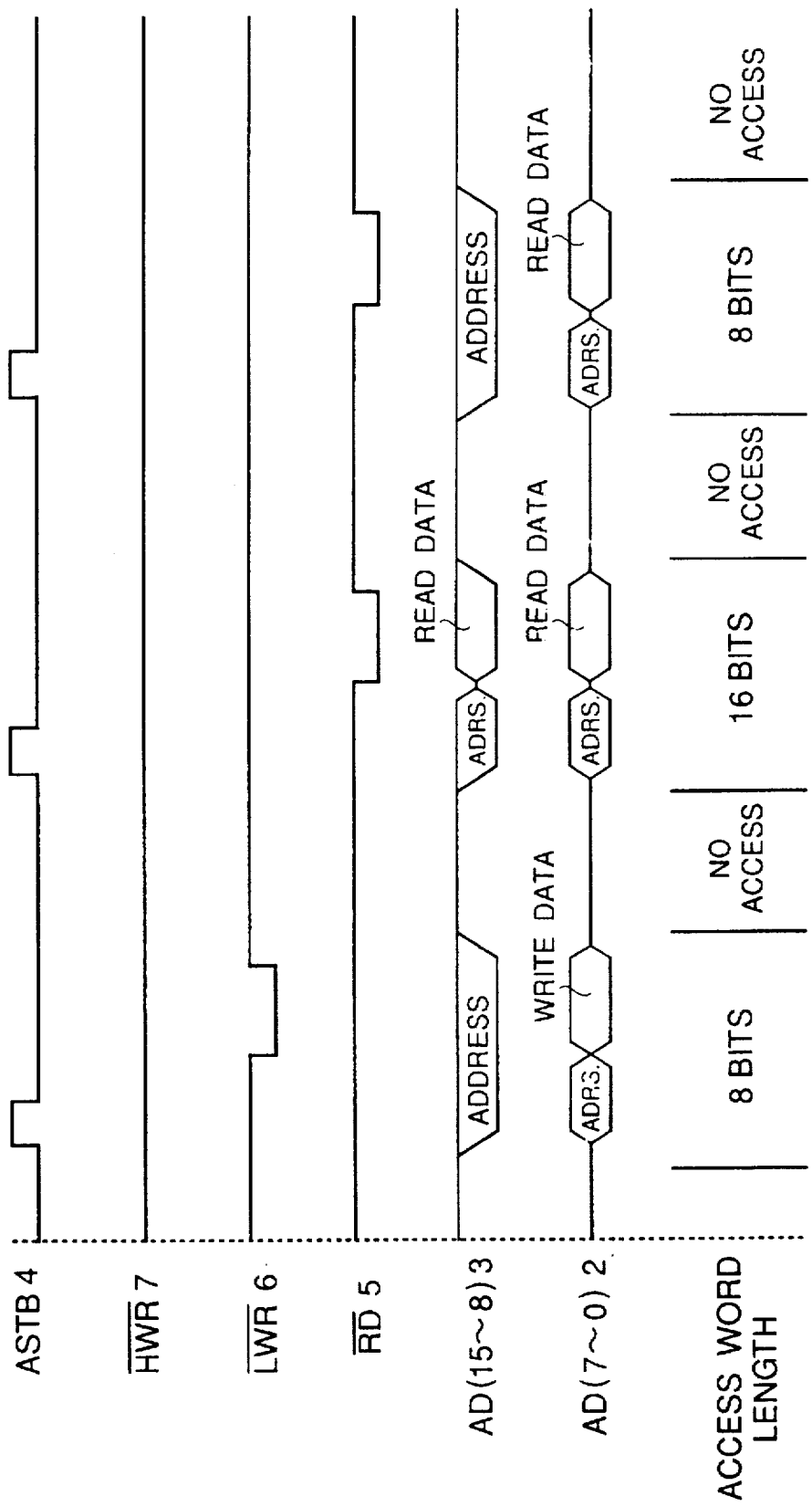
FIG. 9 is a timing chart illustrating a memory access of the second embodiment.

Now, operation will be explained with reference to FIG. 9, which shows a timing chart of the memory access of the second embodiment.

In a period in which the external access is not executed, the timing generating circuit 43 generates the control signals to the address selector 40 so as to cause the address selector 40 to output a high level to the AD(15-8) terminals 3 through the multiplexer 41.

At the access time to the external memory, if the external bus width is designated as 8 bits, the AD(15-8) terminals 3 continue to output the high-order address during the access time.

At the access time in the 16-bit bus width, the AD(15-8) terminals 3 receive and output the high-order address and the data at the odd-numbered address in the time sharing manner similarly to the first embodiment.

In a case that a 8-bit word length memory and a 16-bit word length memory are connected (e.g., a hybrid connection) to the AD(15-8) terminals 3 of the second embodiment, the microcomputer of the second embodiment acts in the time sharing manner with the access of 16-bit bus width, similarly to the first embodiment, and therefore, the address latch of 16 bits is necessary.

Accordingly, the system construction of the second embodiment is substantially the same as that of the first embodiment, and therefore, further explanation will be omitted.

Next, in a case that only 8-bit word length memories are connected to the microcomputer of the second embodiment, the terminal organization and the memory connection of the second embodiment are the same as those of the first embodiment. Therefore, explanation will be also omitted.

In accessing the 8-bit word length memory, the AD(15-8) terminals 3 output the high-order address during the accessing time period, and outputs the high level during a period in which no access is made to the external memory.

Accordingly, even if the AD(15-8) terminals 3 are connected directly to the ROM 115 and the address decoder 13, the microcomputer does not malfunction, nor does the through-current flow.

As seen from the above, the microcomputer of the present invention has means which outputs, during a period in which no access is made to a long length word memory, either one of an address, a high level and a low level, form the address/data terminals that are not used as a data bus. Because of this arrangement, in a system in which only short word length external memories are connected to the microcomputer, it is possible to reduce the number of the address latches provided externally of the microcomputer for connection to the external memories.

Especially, in developing a high performance microcomputer to replace a low end microcomputer that can be connected to only short word length memories, the developed microcomputer may be substituted for the low end microcomputer without modifying the construction of a system including the low end microcomputer. Therefore, since a new system can be constructed without replacing a substrate and others, the present invention can make the system development more efficient.

And, the switching current can be reduced in the address/data time sharing terminals in the case of the first embodiment.

The invention has thus been shown and described with reference to the specific embodiments. However, it should be noted that the present invention is in no way limited to the details of the illustrated structures but changes and modifications may be made within the scope of the appended claims.

I claim:

1. A microcomputer comprising:

a central processing unit having a high-order data bus, a low-order data bus, a high-order address bus, a low-order address bus, and configured to generate at least an external memory selection signal;

a data selector having a first input and a second input connected to said high-order data bus and said low-order data bus, respectively;

an address selector having a first input connected to said high-order address bus;

means for generating a predetermined signal to a second input of said address selector;

a first multiplexer having a first input connected to said high-order data bus and a second input connected to an output of said address selector, an output of said first multiplexer being connected to high-order address/data terminals; and a second multiplexer having a first input connected to an output of said data selector and a second input connected to said low-order address bus, an output of said second multiplexer being connected to low-order address/data terminals, said address selector being controlled by said external memory selection signal such that, with the microcomputer coupled only to external memories having a word length corresponding to that of said low-order address/data terminals, a high-order address on said high-order address bus is outputted through said address selector and said first multiplexer to said high-order address/data bus terminals during a period of accessing to any one of said external memories, and said predetermined signal is outputted from said predetermined signal generating means through said address selector to said high-order address/data bus terminals during a period of accessing to none of said external memories.

2. A microcomputer as in claim 1 wherein said predetermined signal generating means generates one of a high level signal and a low level signal.

3. A microcomputer as in claim 1 wherein said predetermined signal generating means generates the same high-order address as that used when the external memory was accessed just before.

4. A microcomputer as in claim 1 wherein said predetermined signal generating means includes an address latch having an input connected to said high-order address bus and an output connected to said second input of said address selector, said address latch responding to said external memory selection signal to latch an address on said high-order address bus so as to supply the latched address to said address selector when none of said external memories is accessed.

5. A microcomputer comprising:

a central processing unit having a first-order data bus, a second-order data bus, a first-order address bus, and a second-order address bus, and for generating at least an external memory selection signal;

a data selector having a first input and a second input connected to said first-order data bus and said second-order data bus, respectively;

an address selector having a first input connected to said second-order address bus;

means for generating a predetermined signal to a second input of said address selector;

a first multiplexer having a first input connected to said first-order data bus and a second input connected to an output of said address selector, an output of said first multiplexer being connected to first-order address/data terminals; and a second multiplexer having a first input connected to an output of said data selector and a second input connected to said second-order address bus, an output of said second multiplexer being connected to second-order address/data terminals, said address selector being controlled by said external memory selection signal such that, with the microcomputer coupled only to external memories having a word length corresponding to that of said second-order address/data terminals, a first-order address on said first-order address bus is outputted through said address selector and said first multiplexer to said first-order address/data bus terminals during a period of accessing to any one of said external memories.

6. A microcomputer as in claim 5, wherein said address selector is further controlled by said external memory selection signal such that, with the microcomputer coupled only to external memories having a word length corresponding to that of said second-order address/data terminals, said predetermined signal is outputted from said predetermined signal generating means through said address selector to said first-order address/data bus terminals during a period of accessing none of said external memories.

7. A microcomputer as in claim 6, wherein said predetermined signal generating means generates one of a first level signal and a second level signal.

8. A microcomputer as in claim 6, wherein said predetermined signal generating means generates the same first-order address as that used when the external memory was accessed just before.

9. A microcomputer as in claim 6, wherein said predetermined signal generating means includes an address latch having an input connected to said first-order address bus and an output connected to said second input of said address selector.

10. A microcomputer as in claim 9, wherein said address latch responds to said external memory selection signal to latch an address on said first-order address bus so as to supply the latched address to said address selector when none of said external memories is accessed.

* * * * *